Patented Mar. 5, 1935

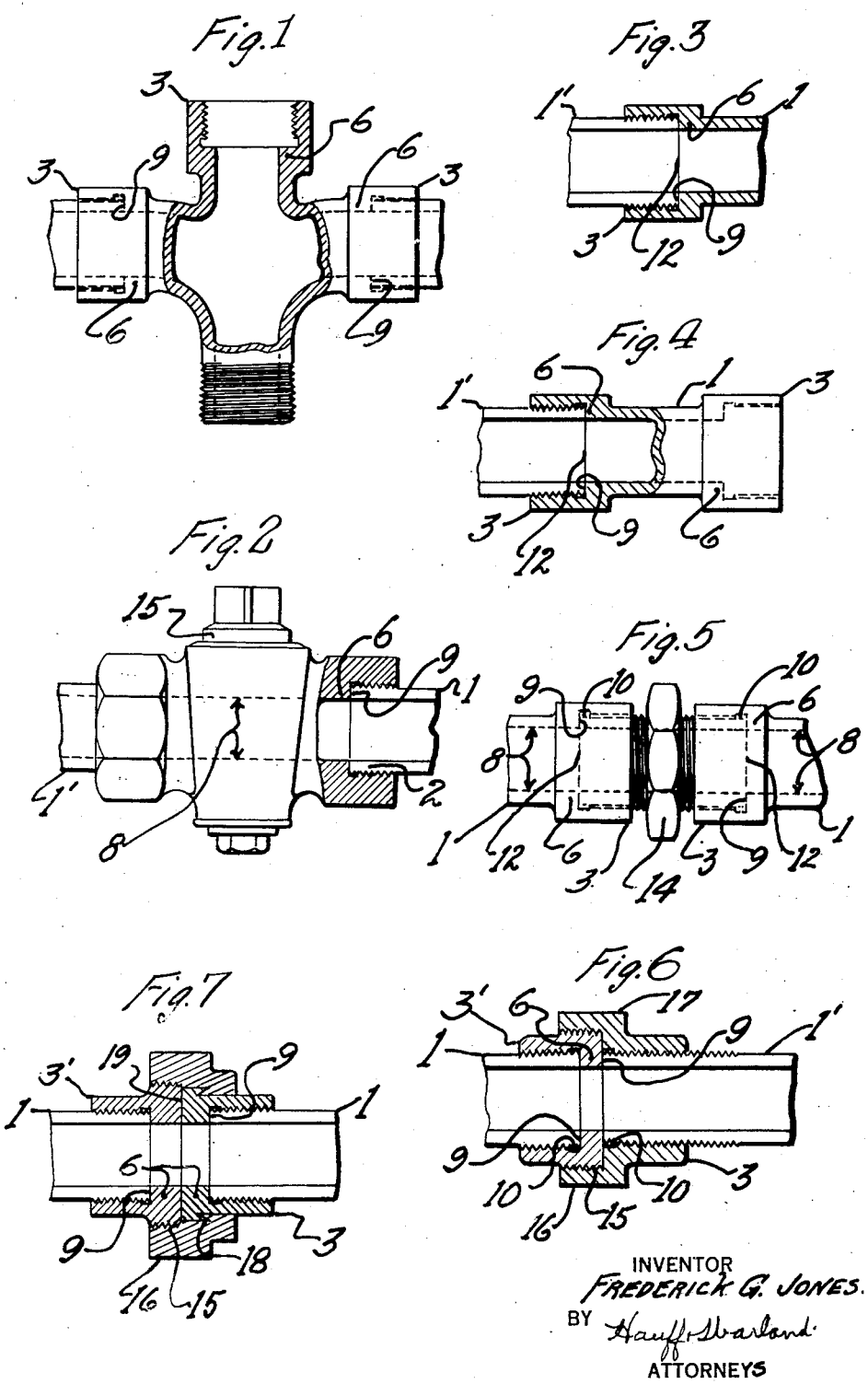

1,993,372

UNITED STATES PATENT OFFICE 1,993,372

SCREWED PIPE JOINT AND IN FITTINGS RELATING THERETO

Frederick George Jones, Bristol, England

Application February 20, 1932, Serial No. 594,278
In Great Britain February 24, 1931

2 Claims. (Cl. 285—120)

This invention relates to pipe joints and fittings as used in connection with installations of steam, gas or hydraulic tubing jointed in screwed joints.

In ordinary practice it is usual to consider the joint as made secure in a number of the screw threads within the sockets and other fittings and upon the tubes to be joined.

To effect this it is not unusual to have the screw threads upon the pipe ends slightly tapered, and the said threads are commonly fitted with yarn and red lead putty before being screwed into joint sockets and other fittings.

It is known that improved socket joints have been suggested wherein the pipes to be jointed are shaped and butted together within the sockets using right and left hand screw threads and such joints have been carefully noted.

These joints, in which the pipes themselves are butted, are used only on straight lines of piping, whereas the improved joints herein described are applicable to all the joints in a system of piping.

The object of my invention may be regarded generally as the provision of a definite seating in all the fittings used in screwed pipe jointing. The said seatings are accurately machined and the ends of the pipes are similarly machined to a true face for butting closely upon the seatings. The fittings described may be of cast steel or of malleable cast iron with the seatings integral with the body of the said fittings, or in some cases the seating is made as a separate ring fitted by screwing or otherwise into any socket or other fitting in which it may conveniently be used. The seating in any form of pipe fitting may be cast as a complete diaphragm across the passage through the fitting and the diaphragm bored to the exact size of the interior diameter of the pipes to be jointed. The bored seatings become a part of the pipe line when the faced ends of the pipes are screwed firmly against the said seatings.

In fittings such as T's, elbows and bends, the seatings are formed integral with the fittings, and the seating is faced on one side only. Separate seating rings of soft metal may be used in conjunction with the integral seatings if desired. The faced seatings described are used also in the valve fittings on the pipe line as in the other fittings herein mentioned, so that the whole of the joints in the system can be relied upon under high pressures. Unusually shaped fittings such as S or U shaped bends are provided with the improved seatings and butted joints.

Having reference to the accompanying drawing:

Fig. 1 is a double T fitting partly in section.

Fig. 2 is an illustration of a valve provided with the improved seating joint and having a clear bore through the valve.

Figures 3 to 7 disclose various arrangements of connecting screw threaded pipes, Figure 7 disclosing my preferred modification.

An important feature of the pipe fittings herein described is the provision of a perfectly clear bore throughout a system of piping and joints of any length, in curved members as in straight lengths, and in the adoption of streamlines of minimum resistance in all fittings used for branching off from the main straight lines.

The seatings described enable a clear bore to be maintained, as the passage through the fittings and pipe joints is simply a continuation of the pipe bore through the seatings, and thereby an unbroken fluid stream is permitted.

Fig. 1 shows a part section of a double T, or cross fitting in one piece which allows several diversions from the prime direction. The butt joints of the pipe ends are similarly made at 9 on the seatings 6 in all the sockets 3, and generally any such fittings can be adapted for the clear bore seating joints.

Fig. 2 is a detail of a plug valve in part section showing the method of application of the improved jointing and clear bore to such fittings. The plug 15 has a clear way 8 corresponding to the bore of the seating 6 and the bore of the pipes 1 and 1'.

The threaded end 2 of the pipe 1 is faced and closely butted at 9 on the seating 6 which is integral with the valve.

Seatings cast or otherwise formed solid with the sockets in any of the fittings may be supplemented by the addition of separate rings of any suitable alloy if desired, and of any thickness. Modification of the pipes, fittings and seatings described are used when desired for any reason in arranging systems of piping. These are shown in Figs. 3, 4 and 5.

In Fig. 3, the pipe 1 has an internally threaded socket 3 which is formed in one piece with the pipe. The seating 6 is faced as before described and pipes or fittings 1' are faced at 12 and butt closely at 9 upon the seating 6.

Fig. 4 shows a straight double socketed pipe or fitting 1 of any suitable length. The sockets 3 are internally threaded and have faced seatings 6 to receive the pipe or fitting 1' faced at 12 to form the joint at 9.

Fig. 5 shows two pipes 1 of any length with sockets 3 integral with the pipes. The sockets are internally threaded and are seated on 6 at 9 to receive the faced ends 12 of the hexagon nipple 14.

Channels or recesses 10 are provided as before described for clearance of the end screw threads, and the sockets and nipple may have right and left hand screw threads or ordinary or of buttressed form. In any of the figures shown and described it will be seen that the bore 8 or interior diameter of the pipes is maintained clear and unobstructed through all the joints and fittings by the use of bored and faced seatings and faced pipe ends.

Fig. 6 shows an alternative form of the joint with a variation in the faced seatings suitable for disconnecting a pipe from the pipe line. The socket 3, as before mentioned, is here in two parts 3, 3'. The faced seating 6 is entirely on the part 3' which is screwed upon the faced pipe 1, making the joint at 9. This part of the socket is threaded exteriorly at 15 to engage screw threads within an enlarged part 16 upon the half socket 3, which is formed hexagonally at 17 for use with a spanner. When the two parts are united to form the socket, the second faced pipe 1' is screwed into the part 3 to butt against the faced seating as shown at 9'. Clearance is provided at 10, as before shown.

Fig. 7 is a similar joint with the two parts 3, 3' each provided with faced seating 6. The said parts are screwed upon the pipes 1, 1' making butt joints at 9 as before described. A third part 16 is threaded to engage the exterior screw threads 15 on part 3'. Annular dovetail recesses at 18, provide means for tightening the face joint 19 when the part 16 is screwed upon the threads at 15 of the part 3'.

Having now particularly described and ascertained the nature of my said invention, and in what manner the same is to be performed, I declare that what I claim is:

1. A pipe coupling comprising two pipes of equal bore, each having its end threaded and its end face machined to form a perfectly flat surface, an interiorly threaded collar in threaded engagement with one of said pipes, said collar being exteriorly threaded and having at its outer end an inwardly directed annular flange, the inner diameter of which is identical with the bore of the pipes and the inner end face of which is machined to coincide with and coact with the machined end of the pipe to form a fluid-tight joint and a second collar interiorly threaded and being of sufficient diameter at one of its ends to engage the threaded end of the second pipe and of sufficient diameter at its other end to engage the exterior threads of the first mentioned collar.

2. A pipe coupling comprising a pair of pipes of equal bore, each having its end exteriorly threaded and its end face machined to form a perfectly flat surface, an interiorly threaded collar engaging the threaded end of one of the pipes, said collar being exteriorly threaded and having an inwardly directed annular flange, the inner diameter of which is identical with the bore of the pipes and the end faces of which are machined to form flat seating surfaces, an interiorly threaded collar engaging the threaded end of the other pipe, the outer surface of said collar being smooth and the outer end of said collar being provided with an outwardly directed flange and an inwardly directed flange, the inner diameter of which is identical with the bore of the pipes and the end faces of which are machined to form flat seating surfaces, the inner faces of each of said inwardly directed flanges being adapted to coact with the end faces of the respective pipes to form fluid-tight joints and the outer faces of said flanges being adapted to coact with each other to form a fluid-tight joint and a third collar having at one of its ends an inwardly directed flange, the inner diameter of which is sufficient to embrace the outer surface of the second mentioned collar and the other end of which is interiorly threaded to engage the exterior threads of the first mentioned collar.

FREDERICK GEORGE JONES.